United States Patent [19]

Touchard

[11] 4,127,704

[45] Nov. 28, 1978

[54] CYLINDRICAL ELECTRIC CELL

[75] Inventor: Rémy Touchard, Poitiers, France

[73] Assignee: SAFT - Societe des Accumulateurs Fixes et de Traction, Romainville, France

[21] Appl. No.: 893,711

[22] Filed: Apr. 5, 1978

[30] Foreign Application Priority Data

Apr. 18, 1977 [FR] France ............................ 77 11565

[51] Int. Cl.² ............................................. H01M 4/00
[52] U.S. Cl. ................................. 429/94; 429/133; 429/140
[58] Field of Search ................ 429/94, 133, 140, 141, 429/136

[56] References Cited

U.S. PATENT DOCUMENTS

| 3,796,606 | 3/1974 | Lehmann et al. | 429/94 |
| 4,048,398 | 9/1977 | Sundberg | 429/140 |

Primary Examiner—Charles F. LeFevour
Attorney, Agent, or Firm—Kenyon & Kenyon, Reilly, Carr & Chapin

[57] ABSTRACT

A cylindrical electric cell which includes at least one positive electrode, at least one negative electrode disposed coaxially therewith and a device for maintaining the distance between these electrodes during discharge. In accordance with the invention, said device is constituted by the combination of a cylinder constituted by practically inextensible wires braided helically and by a spring which maintains this braid resiliently applied against the innermost or the outermost electrode of the electric cell.

5 Claims, 6 Drawing Figures

CYLINDRICAL ELECTRIC CELL

The present invention relates to cylindrical electric cells which include hollow cylindrical electrodes disposed coaxially inside one another, the positive electrodes alternating with the negative electrodes, with a separator interposed between electrodes of opposite polarities. In order to maintain a constant spacing between the electrodes under all circumstances a certain mobility needs to be conferred to the electrodes. This has been done previously by dividing at least the interior electrodes into several portions of a cylinder each having as an average cross-section an arc of a circle and by providing a device which exerts radial pressure to press the electrodes against one another. Such electric cells are described for example in French patent application No. 75 20 496 of 30th June, 1975 published under No. 2,316,759 (corresponding U.S. Pat. No. 4,032,695, British application No. 26926/76 and Japanese application No. 76610/76).

Such a disposition is particularly advantageous when the volume of the electrode changes during electrochemical reactions of the cell (charging or discharging). It can for example apply in the case of cells which include an electrode which is soluble during discharge. The patent mentioned hereinabove gives an example of the device which exerts a radial pressure on the electrodes. But this device is applicable only to electrodes which have some rigidity of their own because the pressure is exerted only on a part of their surface. Now this is not always the case and further the device provides only a centrifugal action, whereas it can be advantageous to have, on the contrary, a centripetal action in the case where the soluble electrode is on the outside of the bundle of electrodes.

Preferred embodiments of the present invention overcome this drawback.

The present invention provides a cylindrical electric cell including at least one cylindrical positive electrode and at least one cylindrical negative electrode disposed in a coaxial bundle, one within the other, at least one of the electrodes being constituted by a plurality of portions of a hollow cylinder each of which has a cross-section in the form of an arc of a circle and which are juxtaposed to obtain a complete cylinder, the cell further including an electrolyte and a separator situated between said electrodes as well as a device intended for maintaining a constant inter-electrode distance during electrochemical reactions within the electric cell, said device consisting of substantially inextensible fibres helically braided to form a cylinder used in conjunction with a spring which maintains this braid under an axially directed force, the braided cylinder being disposed coaxially in contact with a radially extreme electrode of the bundle of electrodes.

Such braids are commercially available, for example for covering or screening electric cables. Since the fibres of which they are made are of substantially constant length, the helices which these fibres form can take any position between two practical end positions in which the fibres jam against one another at either the largest or the smallest pitch. This variability results in a variation in the winding diameter of the fibres and in the length of the cylinder formed by the braid.

It therefore such a braid is associated with a spring which exerts an axial force thereon, the braid will be urged in the direction of an increase in diameter if the force is directed so as to reduce its length. In this case, on condition that the fibres have some stiffness, the braid will therefore exert a radial thrust on the electrode with which it is in contact.

When the force is in the direction for stretching the cylinder, the braid will be urged in the direction of a reduction of its diameter.

In all cases, the urging transmitted by the braid will be distributed evenly over its whole surface and consequently over the whole surface of the electrode which is in contact with it. This electrode need thus have no rigidity of its own while nonetheless retaining a regular shape.

When the braid is formed of metal wires, it can act as a current collector of the electrode against which it presses. Due to the stiffness of the metal it will be particularly suitable for centrifugal thrust operation.

If it is made of glass fibres, it can act at the same time for example for insulating the bundle of electrodes from the casing which contains it. But it can then be used only for stretching, hence for a centripetal attraction.

The invention wil be better understood from the following description given by way of example with reference to the accompanying drawings in which.

Figure 1:
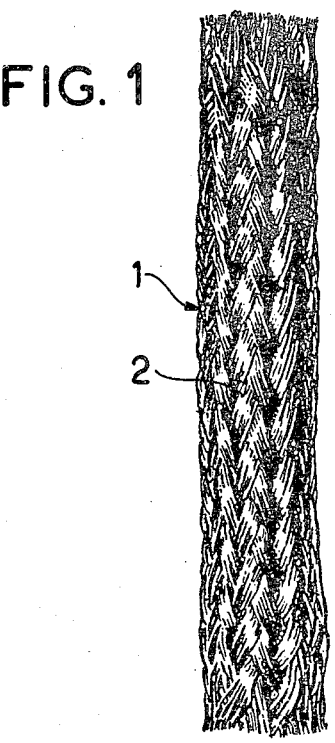
FIG. 1 shows a braid in a configuration of smallest diameter and greatest elongation.
Figure 2:
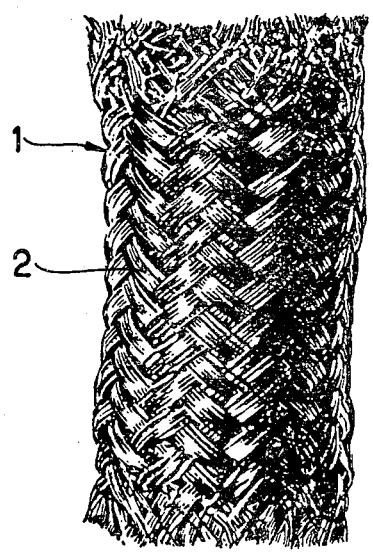
FIG. 2 shows a braid in a configuration of greatest diameter and smallest elongation.

FIGS. 1 and 2 show a cylindrical braid 1 in both its extreme states. As can be seen, this braiding is composed of six-fibre slivers 2 interlaced in such a way that each sliver (and each fibre) describes a helix. Passing from the state of FIG. 1 to the state of FIG. 2, the braid shown varies by 100% with respect to its diameter but only by 26% with respect to its length. These figures can vary according to the method of braiding; it is therefore evident that the braid required is chosen as a function of the height available and the movement which any electrode needs to undergo to maintain constant inter-electrode spacing.

Figure 3:
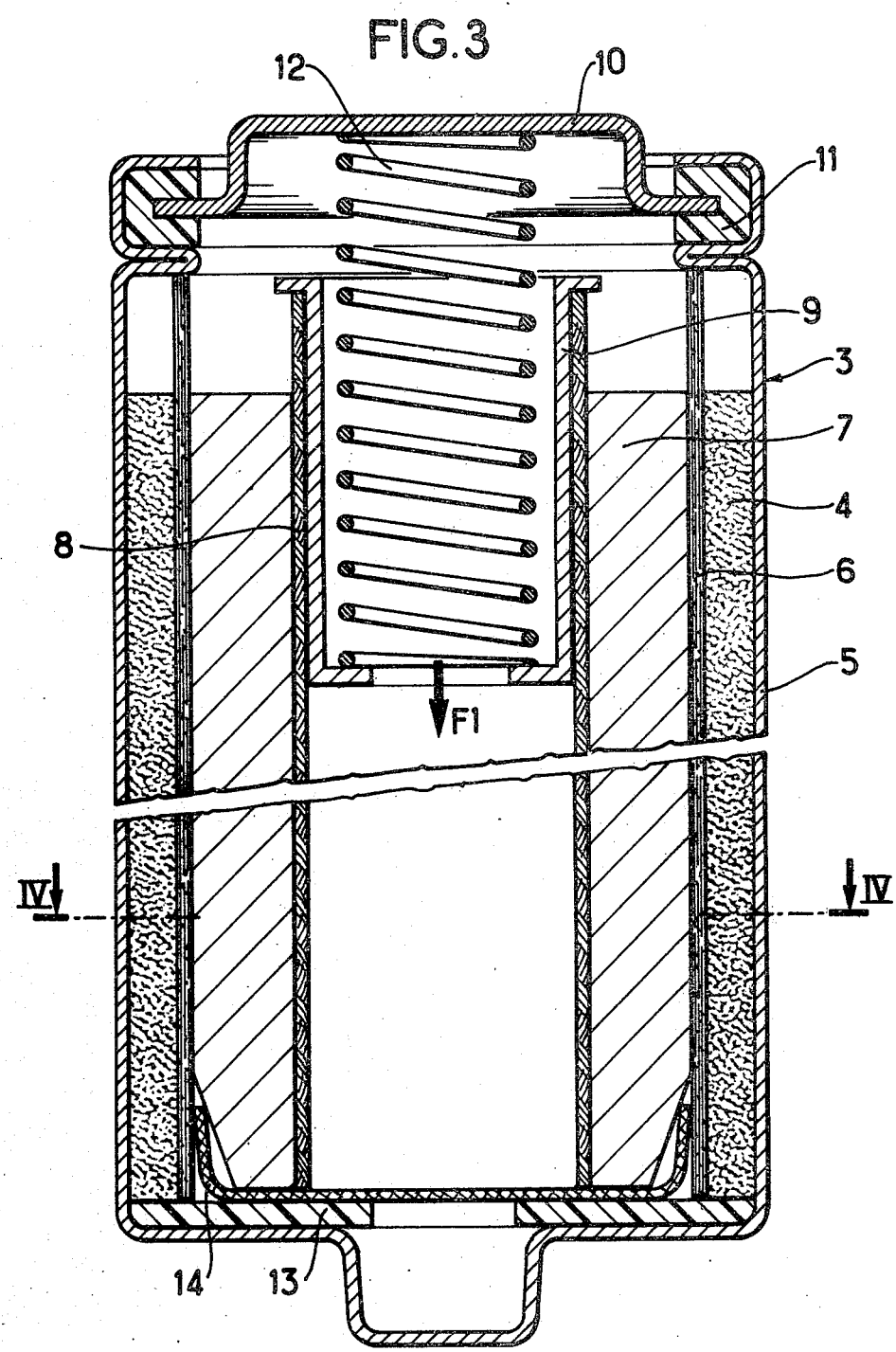
FIG. 3 shows an axial cross-section of an electric cell in accordance with the invention.
Figure 4:
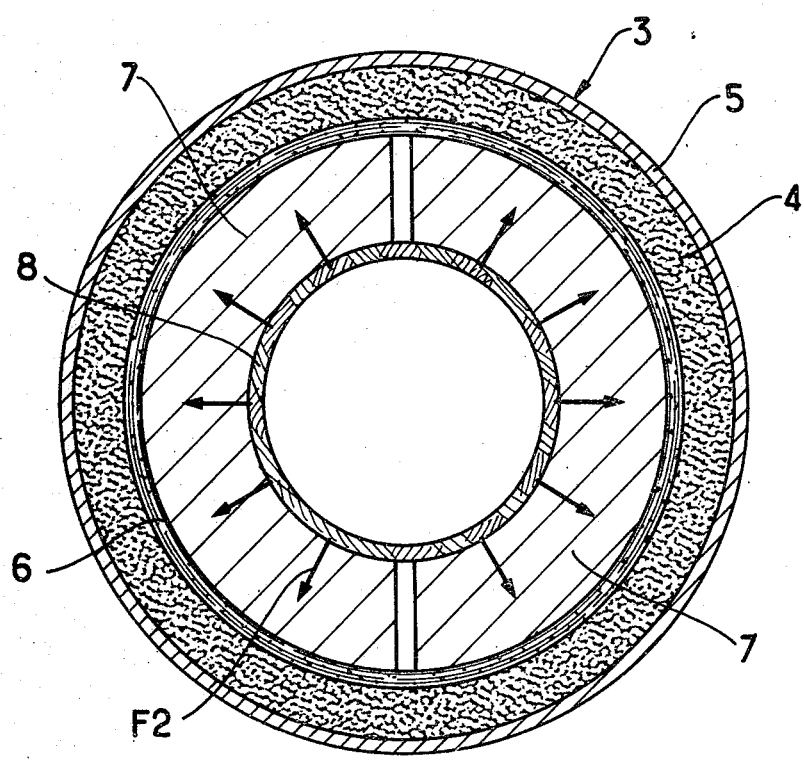
FIG. 4 shows a transversal cross-section of the electric cell in FIG. 3.

FIG. 3 shows a cylindrical electric cell 3 in accordance with the invention seen in an axial cross-section and in FIG. 4, the same electric cell is shown in a cross-section along the line IV—IV of FIG. 3. This electric cell includes a positive electrode 4 placed against the casing 5 of the electric cell. The casing 5 is closed by a cover 10 separated from the casing by an insulating seal 11. In the example described the electric cell is a cell with a non-aqueous electrolyte and the positive active material is copper oxide, but it must be understood that the invention applies to other cells both with aqueous electrolytes and non-aqueous electrolytes, and which have different positive active materials.

A separator 6 is interposed between the electrode 4 and a negative electrode 7 which, as can be seen in FIG. 4, is formed by two semi-cylindrical parts insulated from the bottom of the casing by an insulating disk 13 and an insulating cup 14 (FIG. 3). This negative electrode is, in the example described, made of lithium and is consumed as the cell is discharged. If no preventative measure is taken, the surface of the electrode 7 which is turned towards the electrode 4 moves away from this electrode and there results an increase in the internal resistance which can go as far as interrupting the discharge if contact is broken between the electrode 7 and the separator 6 impregnated with electrolyte. To maintain a constant inter-electrode spacing, a metal braid 8 analogous to the braid 1 shown in FIG. 1 is set in position in its maximum extension state against the internal surface of the electrode 7.

As can be seen in FIG. 3, the braid 8 has at its upper part a flanged tubular distance piece 9. In this distance piece is disposed a spring 12 which, by pressing against the cover 10, operates in compression and consequently exerts an axial thrust on the braid 8 in the direction of the arrow F1 by means of the distance piece 9. Consequently, the braid 8 tends to decrease in height and to increase in diameter under the influence of the spring 12. This results in a centrifugal thrust on the electrode 7, which is shown in FIG. 4 by arrows F2. As the electrode 7 is dissolved, it is therefore pushed against the separator 6, so that the distance between the electrodes 4 and 7 remains constant. The discharge of the cell can therefore continue until it is completed. The braid 8 is made of metal fibres, for example stainless steel and the electrical connection of the electrode 7 with the cover 10 which acts as a negative terminal can be provided by the braid 8, the distance piece 9 and the spring 12.

In the preceding example, the positive and negative electrodes comprised only two hollow concentric cylinders. It is evident that the invention could apply to a number of hollow concentric cylinders greater than two, on condition that the interior cylinders are divided into several portions to allow for centrifugal movement.

Figure 5:
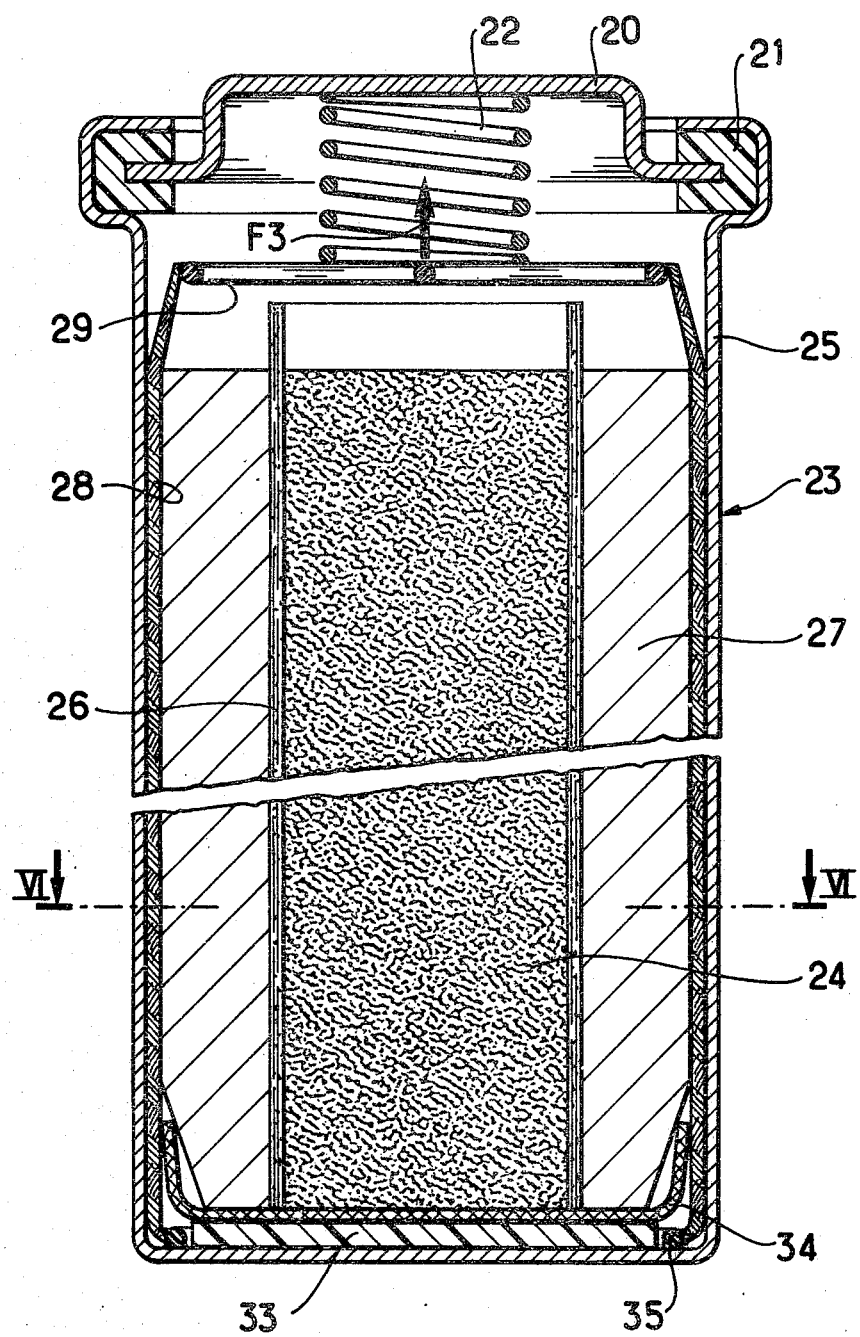
FIG. 5 shows an axial cross-section of another electric cell in accordance with the invention.
Figure 6:
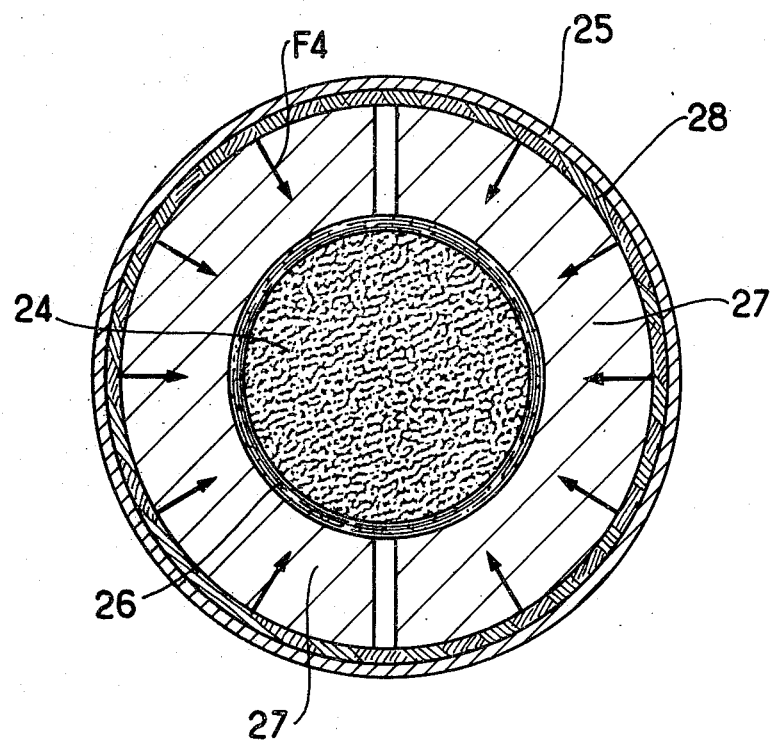
FIG. 6 shows a transversal cross-section of the electric cell in FIG. 5.

FIGS. 5 and 6 show another embodiment of the invention.

The invention again relates here to a cell 23 enclosed in a casing 25 closed by a cover 20 from which it is separated by an insulating seal 21. This time, the positive electrode 24 is situated at the centre and separated from the bottom by a disk 33 and a cup 34 both of which are insulative. It is also separated from the soluble negative electrode 27 by a separator 26.

In FIG. 6, which shows a cross-section of the cell along line VI—VI of FIG. 5, it can be seen that the electrode 27 is made of two hollow half-cylinders. The electrode assembly is surrounded by a braid 28 in its shorter larger diameter state (see FIG. 2). This braid is fixed firstly to a ring 29 with a slightly smaller diameter than that of the braid in the state shown and secondly to a ring 35. The ring 35 is fixed to the bottom of the casing and the ring 29 is fixed to one end of a spring 22 which exerts traction, the other end being fixed to the cover 20. The ring 29 and consequently the end of the braid 28 are attracted in the direction of the arrow F3 (FIG. 5) by the spring. The result of this is that the braid 28 exerts on the electrode 27 a centripetal force in the direction of the arrows F4 in FIG. 6. In this way, as the electrode 27 dissolves (on the interior side), it will be pushed back towards the separator 26 so that the space between the electrodes 24 and 27 will remain constant. In this case, the braid 8 can again be made of metal wires, but it is preferably made of glass fibres which produce a more resilient braid.

The electrical connections firstly between the negative electrode 27 and the cover 20, and secondly between the positive electrode 24 and the casing 23 have not been shown.

As in the case of the embodiment shown in FIGS. 3 and 4, the number of cylinders which constitute the electrodes can be greater than two, on condition that the outer cylinders be made in several parts.

Likewise in the embodiments described, the variable geometry electrode is divided into two half-cylinders, but of course, it could be divided into three portions of a cylinder or more. Both electrodes can also be provided in several portions.

FIGS. 1 and 2 show a braid in which the wires are interlaced in a certain way, but other kinds of braiding could also be suitable.

Generally, it is possible to replace the various means described by equivalent means without thereby going beyond the scope of the invention.

What is claimed is:

1. A cylindrical electric cell including at least one cylindrical positive electrode and at least one cylindrical negative electrode disposed in a coaxial bundle, one within the other, at least one of the electrodes being constituted by a plurality of portions of a hollow cylinder each of which has a cross-section in the form of an arc of a circle and which are juxtaposed to obtain a complete cylinder, the cell further including an electrolyte and a separator situated between said electrodes as well as a device intended for maintaining a constant interelectrode distance during electrochemical reactions within the electric cell, said device consisting of substantially inextensible fibres helically braided to form a cylinder used in conjunction with a spring which maintains this braid under an axially directed force, the braided cylinder being disposed coaxially in contact with a radially extreme electrode of the bundle of electrodes.

2. An electric cell according to claim 1, wherein the spring exerts a force tending to reduce the axial length of the braided cylinder and the braided cylinder is situated inside the bundle of electrodes, to exert a radially outward force thereon, the fibres being sufficiently stiff to exert said outward force.

3. An electric cell according to claim 1, wherein the spring exerts a force tending to increase the axial length of the braided cylinder and the braided cylinder is situated around the bundle of electrodes to exert a radially inward force thereon.

4. An electric cell according to claim 1 wherein the fibres are metal wires.

5. An electric cell according to claim 1 wherein the fibres are glass fibres.

* * * * *